US 6,657,153 B2

(12) United States Patent
McBennett et al.

(10) Patent No.: US 6,657,153 B2
(45) Date of Patent: Dec. 2, 2003

(54) ELECTRODE DIFFUSION BONDING

(75) Inventors: Michael C. McBennett, Lamar, SC (US); Rue Allen Lynch, Florence, SC (US); Tommie Zack Turner, Darlington, SC (US)

(73) Assignee: The ESAB Group, Inc., Florence, SC (US)

( * ) Notice: Subject to any disclaimer, the term of this patent is extended or adjusted under 35 U.S.C. 154(b) by 348 days.

(21) Appl. No.: 09/773,847

(22) Filed: Jan. 31, 2001

(65) Prior Publication Data

US 2002/0139788 A1 Oct. 3, 2002

(51) Int. Cl.⁷ .............................................. B23K 10/00
(52) U.S. Cl. .............. 219/121.52; 219/119; 219/121.59
(58) Field of Search ........................... 219/119, 121.48, 219/121.52, 75, 121.5; 313/23.3, 231.4

(56) References Cited

U.S. PATENT DOCUMENTS

| | | |
|---|---|---|
| 3,198,932 A | 8/1965 | Weatherly |
| 3,930,139 A | 12/1975 | Bykhovsky et al. |
| 4,304,984 A | 12/1981 | Bolotnikov et al. |
| 4,766,349 A | 8/1988 | Johansson et al. |
| 5,021,627 A | 6/1991 | Bersch et al. |
| 5,023,425 A | 6/1991 | Severance, Jr. |
| 5,097,111 A | 3/1992 | Severance, Jr. |
| 5,200,594 A | 4/1993 | Okada et al. |
| 5,628,924 A | 5/1997 | Yoshimitsu et al. |
| 5,676,864 A | 10/1997 | Walters |
| 5,767,478 A | 6/1998 | Walters |
| 5,908,567 A | 6/1999 | Sakuragi et al. |
| 6,020,572 A | 2/2000 | Marner et al. |
| 6,114,650 A | 9/2000 | Marner et al. |
| 6,452,130 B1 * | 9/2002 | Qian et al. .............. 219/121.52 |
| 6,483,070 B1 * | 11/2002 | Diehl et al. ............ 219/121.52 |

FOREIGN PATENT DOCUMENTS

JP    4-147772    5/1992

OTHER PUBLICATIONS

Cross–sectional view of an Electrode.
Osamu Taguchi, Yoshiaki Iijima; Reaction diffusion in the silver–hafnium system; Journal of Alloys and Compounds 226 (1995) 185–189; Sendai, Japan.

* cited by examiner

*Primary Examiner*—Mark Paschall
(74) *Attorney, Agent, or Firm*—Alston & Bird LLP

(57) ABSTRACT

An electrode for a plasma arc torch and method of fabricating the same are disclosed, and wherein the electrode comprises a copper holder defining a cavity in a forward end. An emissive element and separator assembly is positioned in the cavity, and no brazing materials are used to secure the components of the electrode. The emissive element, separator, and metallic holder are heated to accelerate diffusion bonding between the emissive element and separator, and between the separator and metallic holder. A crimping process is also disclosed for further strengthening the electrode and increasing the operational life span thereof.

20 Claims, 7 Drawing Sheets

ELECTRODE DIFFUSION BONDING

FIELD OF THE INVENTION

The present invention relates to plasma arc torches and, more particularly, to a method of forming an electrode for supporting an electric arc in a plasma arc torch.

BACKGROUND OF THE INVENTION

Plasma arc torches are commonly used for the working of metals, including cutting, welding, surface treatment, melting, and annealing. Such torches include an electrode which supports an arc which extends from the electrode to the workpiece in the transferred arc mode of operation. It is also conventional to surround the arc with a swirling vortex flow of gas, and in some torch designs it is conventional to also envelop the gas and arc with a swirling jet of water.

The electrode used in conventional torches of the described type typically comprises an elongate tubular member composed of a material of high thermal conductivity, such as copper or a copper alloy. The forward or discharge end of the tubular electrode includes a bottom end wall having an emissive element embedded therein which supports the arc. The element is composed of a material which has a relatively low work function, which is defined in the art as the potential step, measured in electron volts (ev), which permits thermionic emission from the surface of a metal at a given temperature. In view of its low work function, the element is thus capable of readily emitting electrons when an electrical potential is applied thereto. Commonly used emissive materials include hafnium, zirconium, tungsten, and their alloys. Some electrodes include a relatively non-emissive separator, which is disposed about the emissive element and acts to prevent the arc from migrating from the emissive element to the copper holder.

A problem associated with torches of the type described above is the short service life of the electrode, particularly when the torch is used with an oxidizing gas, such as oxygen or air. More particularly, the gas tends to rapidly oxidize the copper of the electrode that surrounds the emissive element, and as the copper oxidizes, its work function decreases. As a result, a point is reached at which the oxidized copper surrounding the emissive element begins to support the arc, rather than the element. When this happens, the copper oxide and the supporting copper melt, resulting in early destruction and failure of the electrode.

The assignee of the present application has previously developed an electrode with significantly improved service life, as described in U.S. Pat. No. 5,023,425, the entire disclosure of which is hereby incorporated by reference. The '425 patent discloses an electrode comprising a metallic tubular holder supporting an emissive element at a front end thereof, and having a relatively non-emissive separator or sleeve surrounding the emissive element and interposed between the emissive element and the metallic holder. In particular, the '425 patent describes the fabrication of the metallic holder by axially drilling the separator and force fitting the emissive element therein. The resulting interference or frictional fit holds the emissive element in the separator, and the front face of the assembly is then finished to form a common front planar surface.

Processes have also been developed to increase the bond strength between the emissive element and the metallic holder. In particular, U.S. Pat. No. 5,200,594 describes a pressing process wherein the emissive element is coated with nickel and silver films, and then inserted into a metallic holder. The base of the electrode having the emissive element inserted therein is pressed from the periphery to the center by using pressing tools. The pressing process increases the bond between the films coating the emissive element and the metallic holder, which therefore improves the life span of the electrode.

The electrode and process of forming an electrode as described by the '594 patent, however, increases the fabrication cost of the electrode due to the multiple film layers that must be applied in order to form a strong bond with the metallic holder. And electrodes according to the '425 patent, although a great advance over prior electrodes, still have a life span that electrode manufacturers and users would like to see extended. Thus, there is a need to increase the life span and performance of an electrode without requiring extra or special coatings, films, or brazing materials to be applied between the emissive element, separator, and/or metallic holder.

SUMMARY OF THE INVENTION

The present invention was developed to improve upon conventional methods of making electrodes, and more particularly methods of making electrodes disclosed in the above-referenced '594 patent. It has been discovered that the difficulties of the electrodes described above, namely increasing the life and performance of electrodes for plasma torches, can be overcome by providing an electrode by heating the electrode near the end of the manufacturing process to accelerate diffusion bonding between elements of the electrode. Advantageously, the "post-assembly" heating process forms stronger bonds between components of the electrode, which results in longer time and better performance of the electrode.

In particular, a method of fabricating an electrode according to the present invention includes forming an assembly by inserting an emissive element having a relatively low work function in a relatively non-emissive separator. The separator, which is formed of a metallic material having a work function greater than that of the emissive element, has inner and outer surfaces wherein the inner surface of the separator is in face-to-face contact with the emissive element. The assembly is positioned in a cavity defined by a metallic holder, the cavity being in surface-to-surface contact with the outer surface of the separator. After the assembly is in place, the metallic holder and assembly are heated to accelerate diffusion bonding between the emissive element and separator, and between the separator and the metallic holder.

The heating step comprises heating the metallic holder and the assembly to between about 1400°–1420° F. for at least 5 hours and, more preferably, to about 1410° F. for about 6.5 hours. In this manner, diffusion bonding, which also takes place at room or ambient temperatures but orders of magnitude slower, occurs relatively rapidly to increase the bonds between the emissive element and separator, and between the separator and the metallic holder. Because these elements are more secure, the Inventors have discovered that the life span of the electrode is greatly improved over conventional electrodes. In addition, brazing materials or coatings are not used according to the methods of the present invention, which thereby decreases the costs of manufacturing the electrode.

In a preferred embodiment, the heating process is followed by a crimping process, preferably after allowing the electrode to cool to ambient or room temperature. The crimping process includes using pressing tools to press the outer surface of the metallic holder radially inwardly towards the cavity defined therein in order to reduce the overall outer shape of the metallic holder. In one embodiment, the crimping process reduces the outer diameter or shape of the metallic holder by between about 0.050–0.100 inches, which is sufficient to add further strength and hardness to the electrode. The crimping process also substantially eliminates any voids present between the emissive element and the separator, and between the separator and the metallic holder that can lead to early failure of the electrode.

Thus, the present invention provides methods of making an electrode having stronger bonds between elements of the electrode, which improves the strength and operational life span of the electrode. Furthermore, the methods of making an electrode according to the present invention are directed to electrodes having no brazing materials, coatings, or other layers present between the emissive element, separator, or metallic holder. In this regard, the cost and complexity of fabricating the electrode is reduced.

BRIEF DESCRIPTION OF THE DRAWINGS

Figure 1:
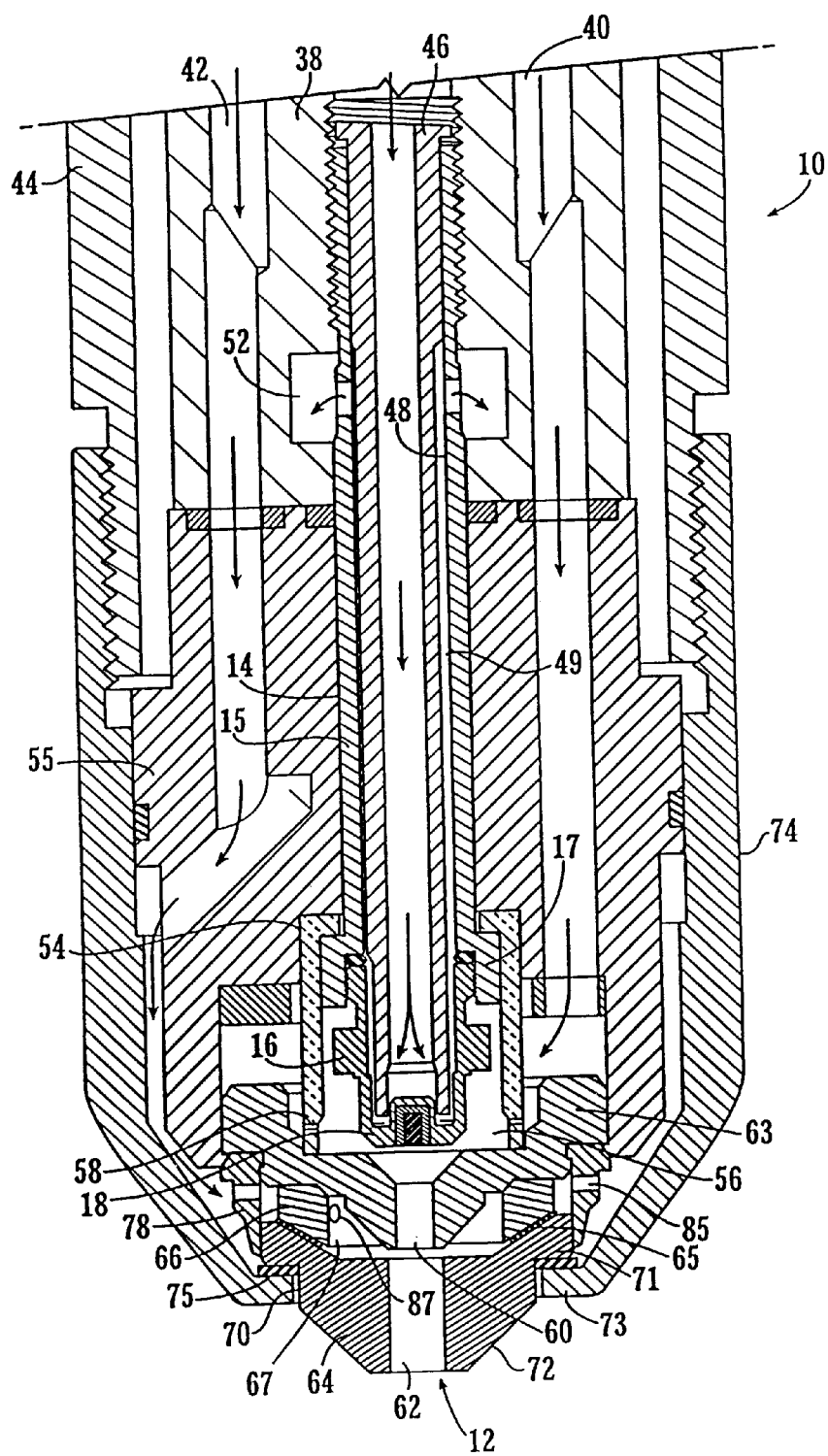
Figure 2:
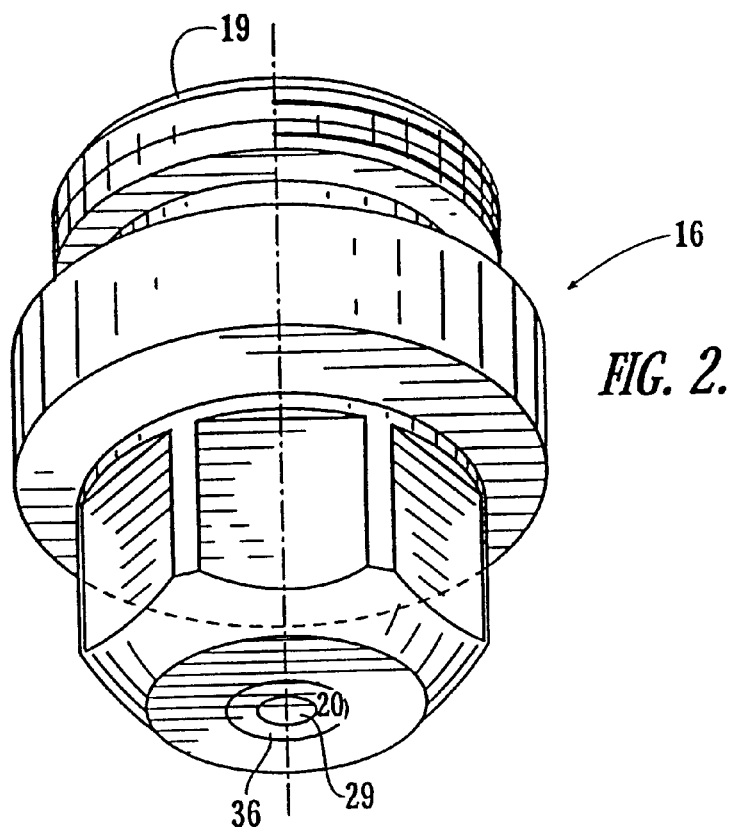
Figure 3:
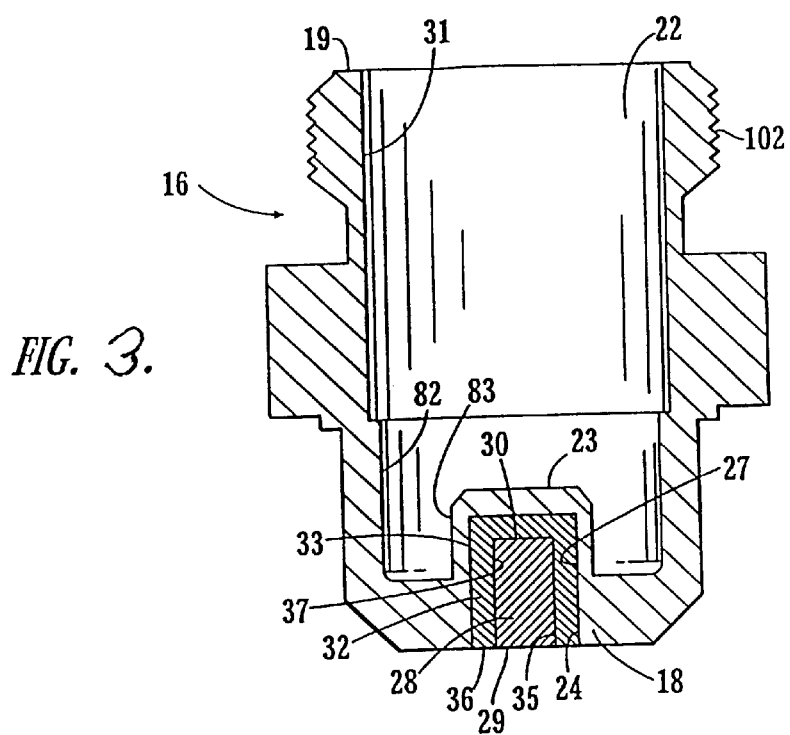
Figure 10:
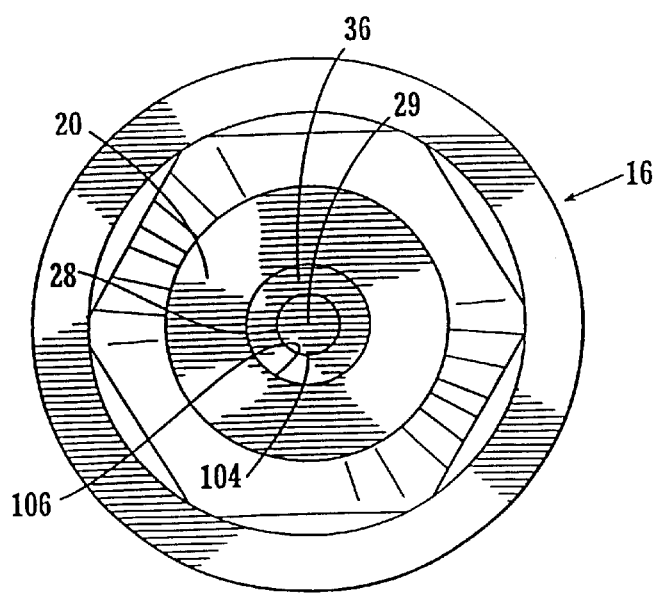
Figure 7:
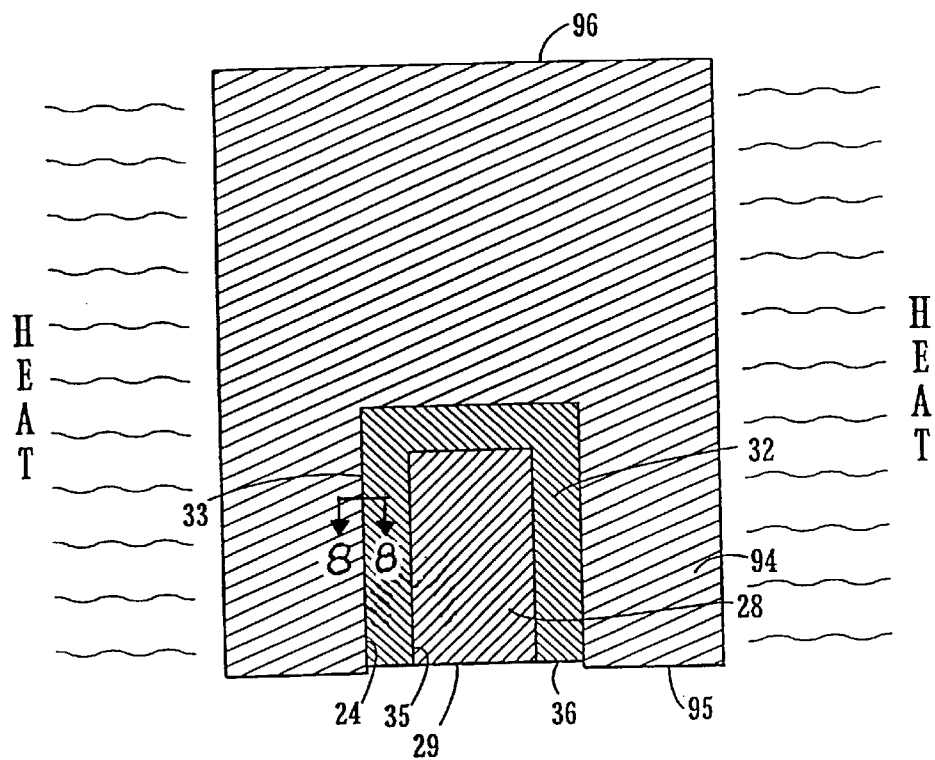
Figure 8:
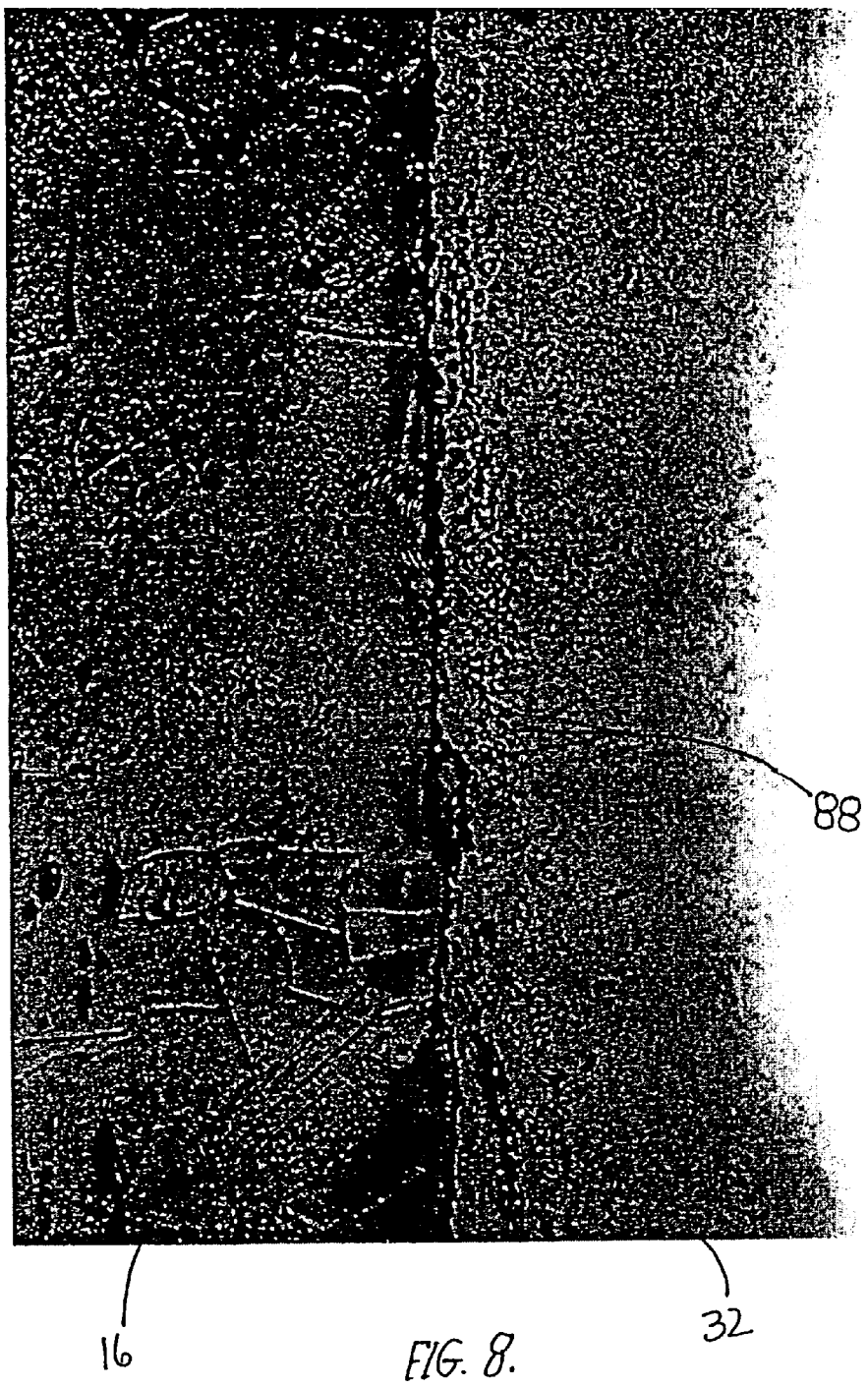
Figure 9:
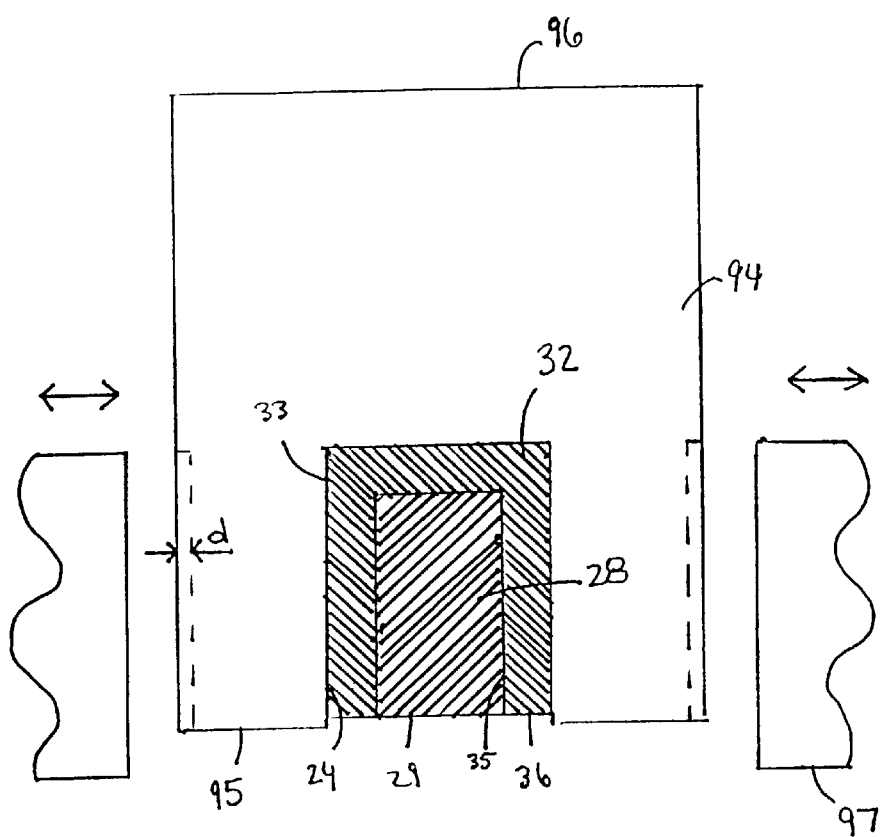

Having thus described the invention in general terms, reference will now be made to the accompanying drawings, which are not necessarily drawn to scale, wherein:

FIG. 1 is a sectioned side elevational view of a plasma arc torch which embodies the features of the present invention;

FIG. 2 is an enlarged perspective view of an electrode in accordance with the present invention;

FIG. 3 is an enlarged sectional side view of an electrode in accordance with the present invention;

FIGS. 4–7 are schematic views illustrating the steps of a preferred method of fabricating the electrode in accordance with the invention;

FIG. 8 is a greatly enlarged sectional view of the electrode of the present invention as seen along lines 8—8 of FIG. 7 shortly after a heating operation;

FIG. 9 is an enlarged sectional side view illustrating the steps of a preferred method of fabricating the electrode in accordance with the invention; and FIG. 10 is an end elevational view of the finished electrode in accordance with the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

With reference to FIGS. 1–3, a plasma arc torch 10 embodying the features of the present invention is depicted. The torch 10 includes a nozzle assembly 12 and a tubular electrode 14. The electrode 14 preferably is made of copper or a copper alloy, and is composed of an upper tubular member 15 and a lower cup-shaped member or holder 16. The upper tubular member 15 is of elongate open tubular construction and defines the longitudinal axis of the torch 10. The upper tubular member 15 includes an internally threaded lower end portion 17. The holder 16 is also of tubular construction, and includes a lower front end and an upper rear end. A transverse end wall 18 closes the front end of the holder 16, and the transverse end wall 18 defines an outer front face 20. The rear end of the holder 16 is externally threaded and is threadedly joined to the lower end portion 17 of the upper tubular member 15.

The holder 16 is open at the rear end 19 thereof such that the holder is of cup-shaped configuration and defines an internal cavity 22. The internal cavity 22 has a surface 31 that includes a cylindrical post 23 extending into the internal cavity along the longitudinal axis. A generally cylindrical cavity 24 is formed in the front face 20 of the end wall 18 and extends rearwardly along the longitudinal axis and into a portion of the holder 16. The cavity 24 includes inner side surface 27.

A relatively non-emissive separator 32 is positioned in the cavity 24 and is disposed coaxially along the longitudinal axis. The separator 32 has an outer peripheral wall 33 extending substantially the length of the cavity 24. The peripheral wall 33 is illustrated as having a substantially constant outer diameter over the length of the separator, although it will be appreciated that other geometric configurations would be consistent with the scope of the invention, such as frustoconical. The separator 32 also defines an internal cavity 35 having a surface 37. The separator 32 also includes an outer end face 36 which is generally flush with the front face 20 of the holder 16.

An emissive element or insert 28 is positioned in the separator 32 and is disposed coaxially along the longitudinal axis. More specifically, the emissive element 28 and the separator 32 form an assembly wherein the emissive element is secured to the separator by an interference or press fit coupled with an advantageous form of diffusion bonding, which is effected by heating the emissive element and separator, as discussed more fully below. The emissive element 28 has a circular outer end face 29 lying in the plane of the front face 20 of the holder 16 and the outer end face 36 of the separator 32. The emissive element 28 also includes a generally circular inner end face 30 which is disposed in the cavity 35 defined by the separator 32 and is opposite the outer end face 29. The inner end face 30, however, can have other shapes, such as pointed, polygonal, or spherical, in order to assist in securing the emissive element to the separator 32. In addition, the diameter of the emissive element 28 is about 30–80 percent of the outer diameter of the end face 36 of the separator 32, which has a radial thickness of at least about 0.25 mm (0.01 inch) at the outer end face 36 and along its entire length. As a specific example, the emissive element 28 typically has a diameter of about 0.08 inch and a length of about 0.25 inch, and the outer diameter of the separator 32 is about 0.25 inch.

The emissive element 28 is composed of a metallic material having a relatively low work function, such as in a range of about 2.7 to 4.2 ev, so as to be capable of readily emitting electrons upon an electrical potential being applied thereto. Suitable examples of such materials are hafnium, zirconium, tungsten, and mixtures thereof.

The separator 32 is composed of a metallic material having a work function that is greater than that of the material of the holder 16, according to values presented in Smithells Metal Reference Book, 6th Ed. More specifically, it is preferred that the separator 32 be composed of a metallic material having a work function of at least about 4.3 ev. In a preferred embodiment, the separator 32 comprises silver, although other metallic materials, such as gold, platinum, rhodium, iridium, palladium, nickel, and alloys thereof, may also be used. The selected material for the separator 32 should have high thermal conductivity, high resistance to oxidation, high melting point, high work function, and low cost. Although it is difficult to maximize all of these properties in one material, silver is preferred due to its high thermal conductivity.

For example, in one particular embodiment of the present invention, the separator 32 is composed of a silver alloy material comprising silver alloyed with about 0.25 to 10 percent of an additional material selected from the group consisting of copper, aluminum, iron, lead, zinc, and alloys thereof, such as, for example, sterling silver. The additional material may be in elemental or oxide form, and thus the term "copper" as used herein is intended to refer to both the elemental form as well as the oxide form, and similarly for the terms "aluminum" and the like. With reference again to FIG. 1, the electrode 14 is mounted in a plasma torch body 38, which includes gas and liquid passageways 40 and 42, respectively. The torch body 38 is surrounded by an outer insulated housing member 44. A tube 46 is suspended within the central bore 48 of the electrode 14 for circulating a liquid cooling medium, such as water, through the electrode 14. The tube 46 has an outer diameter smaller than the diameter of the bore 48 such that a space 49 exists between the tube 46 and the bore 48 to allow water to flow therein upon being discharged from the open lower end of the tube 46. The water flows from a source (not shown) through the tube 46, inside the internal cavity 22 and the holder 16, and back through the space 49 to an opening 52 in the torch body 38 and to a drain hose (not shown). The passageway 42 directs injection water into the nozzle assembly 12 where it is converted into a swirling vortex for surrounding the plasma arc, as further explained below. The gas passageway 40 directs gas from a suitable source (not shown), through a gas baffle 54 of suitable high temperature material into a gas plenum chamber 56 via inlet holes 58. The inlet holes 58 are arranged so as to cause the gas to enter in the plenum chamber 56 in a swirling fashion. The gas flows out of the plenum chamber 56 through coaxial bores 60 and 62 of the nozzle assembly 12. The electrode 14 retains the gas baffle 54. A high-temperature plastic insulator body 55 electrically insulates the nozzle assembly 12 from the electrode 14.

The nozzle assembly 12 comprises an upper nozzle member 63 which defines the first bore 60, and a lower nozzle member 64 which defines the second bore 62. The upper nozzle member 63 is preferably a metallic material, and the lower nozzle member 64 is preferably a metallic or ceramic material. The bore 60 of the upper nozzle member 63 is in axial alignment with the longitudinal axis of the torch electrode 14. The lower nozzle member 64 is separated from the upper nozzle member 63 by a plastic spacer element 65 and a water swirl ring 66. The space provided between the upper nozzle member 63 and the lower nozzle member 64 forms a water chamber 67.

The lower nozzle member 64 comprises a cylindrical body portion 70 that defines a forward or lower end portion and a rearward or upper end portion, with the bore 62 extending coaxially through the body portion 70. An annular mounting flange 71 is positioned on the rearward end portion, and a frustoconical surface 72 is formed on the exterior of the forward end portion coaxial with the second bore 62. The annular flange 71 is supported from below by an inwardly directed flange 73 at the lower end of the cup 74, with the cup 74 being detachably mounted by interconnecting threads to the outer housing member 44. A gasket 75 is disposed between the two flanges 71 and 73.

The bore 62 in the lower nozzle member 64 is cylindrical, and is maintained in axial alignment with the bore 60 in the upper nozzle member 63 by a centering sleeve 78 of any suitable plastic material. Water flows from the passageway 42 through openings 85 in the sleeve 78 to the injection ports 87 of the swirl ring 66, which injects the water into the water chamber 67. The injection ports 87 are tangentially disposed around the swirl ring 66, to impart a swirl component of velocity to the water flow in the water chamber 67. The water exits the water chamber 67 through the bore 62.

A power supply (not shown) is connected to the torch electrode 14 in a series circuit relationship with a metal workpiece, which is usually grounded. In operation, a plasma arc is established between the emissive element 28 of the electrode, which acts as the cathode terminal for the arc, and the workpiece, which is connected to the anode of the power supply and is positioned below the lower nozzle member 64. The plasma arc is started in a conventional manner by momentarily establishing a pilot arc between the electrode 14 and the nozzle assembly 12, and the arc is then transferred to the workpiece through the bores 60 and 62.

Method of Fabrication

Figure 4:
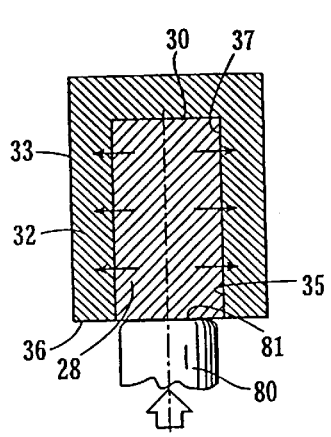

The invention also provides a simplified method for fabricating an electrode of the type described above. FIGS. 4–7 illustrate a preferred method of fabricating the electrode in accordance with the present invention. As shown in FIG. 4, the emissive insert 28 is disposed in the cavity 35 defined by the separator 32. According to one embodiment, the emissive element 28 is disposed in the cavity 35 of the separator 32 by using a tool 80 having a generally planar circular working surface 81. The tool 80 is placed with the working surface 81 in contact with the emissive element 28 in the cavity 35. The outer diameter of the working surface 81 is slightly smaller than the diameter of the cavity 35 defined by the separator 32. The tool 80 is held with the working surface 81 generally coaxial with the longitudinal axis of the torch 10, and force is applied to the tool so as to impart axial compressive forces to the emissive element 28 and the separator 32 along the longitudinal axis. For example, the tool 80 may be positioned in contact with the emissive element 28 and separator 32 and then struck by a suitable device, such as the ram of a machine. Regardless of the specific technique used, sufficient force should be imparted so as to position the emissive element 28 in the cavity 35 of the separator 32 such that the inner end face 30 of the emissive element is in surface-to-surface contact with the separator. In one embodiment, the compressing action of the emissive element 28 also results in the emissive element and the separator 32 being slightly deformed radially outwardly such that the emissive element 28 is tightly gripped and retained by the separator in a surface-to-surface relationship.

Figure 5:
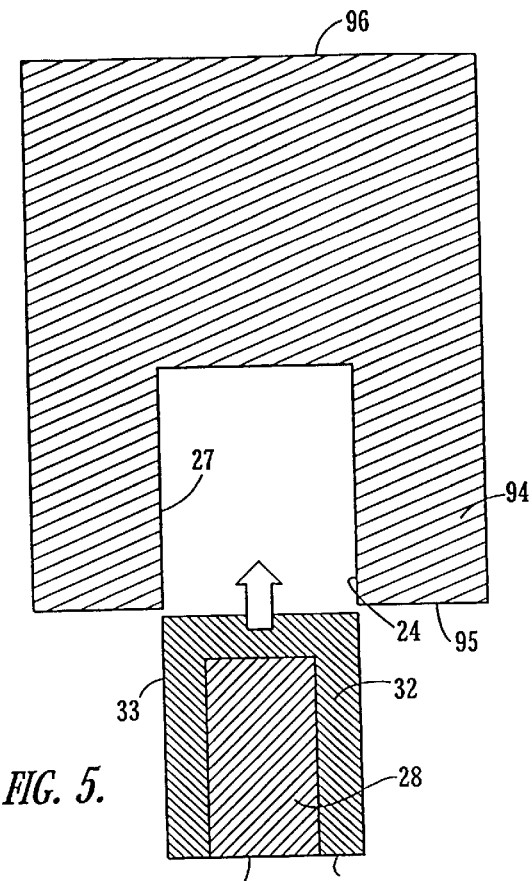

Turning to FIG. 5, a cylindrical blank 94 of copper or copper alloy is provided having a front face 95 and an opposite rear face 96. A generally cylindrical bore is then formed, such as by drilling, in the front face 95 along the longitudinal axis so as to form the cavity 24 as described above. The emissive element 28 and separator 32 assembly is then inserted into the cavity 24, such as by press-fitting, such that the peripheral wall 33 of the separator slidably engages the inner wall 27 of the cavity and is secured thereto in a surface-to-surface, frictional relationship.

Figure 6:
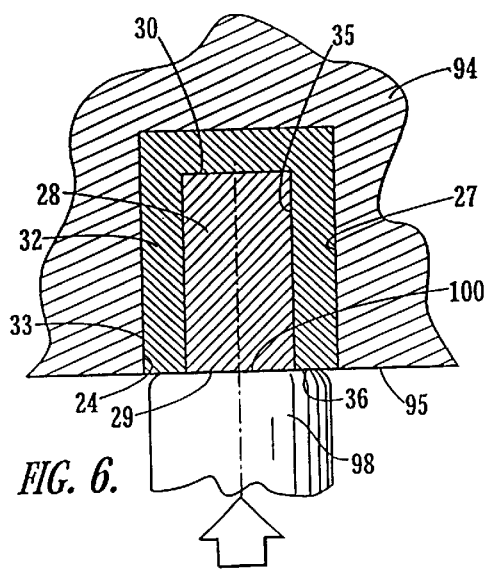

According to one embodiment shown in FIG. 6, a tool 98 having a generally planar circular working surface 100 is placed with the working surface in contact with the end faces 29 and 36 of the emissive element 28 and separator 32, respectively. The outer diameter of the working surface 100 is slightly smaller than the diameter of the cavity 24 in the cylindrical blank 94. The tool 98 is held with the working surface 100 generally coaxial with the longitudinal axis of the torch 10, and force is applied to the tool so as to impart axial compressive forces to the emissive element 28 and the separator 32 along the longitudinal axis. For example, the tool 98 may be positioned in contact with the emissive element 28 and separator 32 and then struck by a suitable device, such as the ram of a machine. Regardless of the specific technique used, sufficient force is imparted so as to cause the emissive element 28 and the separator 32 to be deformed radially outwardly such that the emissive element is tightly gripped and retained by the separator, and the separator is tightly gripped and retained by the cavity 24, as shown in FIG. 7.

FIG. 7 also shows the addition of heat to the cylindrical blank 94, which results in improved properties and life span of the electrode. The heating process can occur after the emissive element 28 and separator 32 assembly has been positioned in the metallic holder or blank. The heating process could also be performed after further machining steps are performed on the cylindrical blank, as described below. The exact heating process is dependent on the materials used in the emissive element 28 and the material used in the separator 32. In particular, the heating process is determined by the melting temperature of the materials, and is performed to accelerate diffusion bonding between the emissive element 28 and the separator 32, and the separator and the metallic holder or blank.

Diffusion bonding occurs when two pieces of metal are pressed and held together. Atoms of one metal will migrate to the other metal and vice-versa. At room temperature, significant diffusion bonding may take several years to develop, but it will occur. However, the Inventors have discovered that by heating the electrode after the assembly has been inserted in the metallic holder or blank, the rate of diffusion bonding increases. Specifically, the Inventors have discovered that the amount of diffusion bonding between the emissive element 28 and the separator 32 is proportional to the temperature and the square root of heating time. The same is generally true for the separator 32 and the metallic blank 94. In this regard, the electrode should be heated to a point where the diffusion bonding process is accelerated, but not to a point where the materials forming the emissive element 28, separator 32, or metallic blank 94 begin to melt, as this can destroy the diffusion bond between the metallic blank and the separator, and can result in adverse alloying of the separator material.

For example, in one advantageous embodiment the emissive element 28 is formed of hafnium, and the separator 32 is formed primarily of silver, such as sterling silver. The metallic blank 94 is formed of copper. After the emissive element 28 and separator 32 assembly is positioned in the blank, which according to one embodiment includes plastically deforming the separator 32 between the emissive element and metallic blank 94, the assembly is heated to a temperature below the melting points of the emissive element, separator, and metallic blank. In this example, the electrode is heated to a temperature below 1432° F., which is the melting temperature of copper-silver eutectic alloy, such as heating the electrode to between about 1400°–1420° F., and more particularly to about 1410° F., for at least 5 hours. In this example, the electrode is heated for about 6.5 hours. The resulting diffusion bonds that occur between the emissive element 28, separator 32, and between the separator and the metallic blank 94 have thicknesses of about 0.0004" and 0.005", respectively. At these thicknesses, the emissive element 28, separator 32, and metallic blank 94 are strongly bonded together, which allows the torch to operate longer before the electrode fails.

Another way to explain the benefits of this post-assembly heating process as presently understood by the Inventors is to recognize how the heating process affects the intra-metallic bond stress levels of the emissive element 28, separator 32, and metallic holder or blank 94. In particular, the intra-metallic bonds (i.e., the bonds between the individual molecules of the material) of each of these components has an initial stress level or stressed state, which results from stressing the intra-metallic bonds during formation of the individual component. At the initial stress level, the intra-metallic bonds of each component are resistant to forming diffusion bonds with adjacent materials. By heating the electrode as described above, the intra-metallic bonds are reduced from the initial stressed state to a lower stressed state. This occurs because the heating step allows the intra-metallic bonds to re-align and fall into a lower energy state. At the lower stressed state, the intra-metallic bonds are less resistant to forming diffusion bonds with adjacent materials, which thereby permits the more rapid formation of the diffusion bonds discussed above.

FIG. 8 shows a detailed cross-sectional view of the separator 32 and the metallic holder 16 after the heating process shown in FIG. 7. Specifically, FIG. 8 shows a greatly enlarged view of the interface between the separator 32 and the metallic holder 16 along lines 8—8 in FIG. 7. In a presently preferred embodiment, the separator 32 is formed primarily of silver, and the metallic holder 16 is formed primarily of copper. As shown in FIG. 8, the heating process causes diffusion bonding to occur between the separator 32 and the metallic holder 16, which results in small portions or formations 88 of the metallic holder 16 to migrate beyond the interface and into the separator 32.

FIG. 9 shows another process that also enhances the strength of the electrode and thus the operational life span of the electrode. In particular, FIG. 8 illustrates a crimping process at the front end of the electrode using pressing tools 97. The pressing tools 97 act radially inwardly against the outer surface of the metallic blank 94 to press the blank, separator 32, and emissive element 28 together, which further bonds the materials together. In one embodiment, the diameter of the metallic blank 94 is reduced an amount d, which in one embodiment is between about 0.050–0.100 inches. The outer shape can also be changed during crimping, such as from a cylindrical blank to a hexagonal shape as illustrated. The crimping process could also be performed after the blank 94 has been machined into a near-final form.

The crimping process provides at least two benefits. One benefit is that the pressing action causes any voids present between the emissive element 28, separator 32, and metallic blank 94 to be substantially eliminated. This is important because voids act as stress concentrators, which may lead to early failure of the electrode. Another benefit is that the pressing action restores the yield strength and hardness of the emissive element 28, separator 32, and metallic blank 94 that were lost during the heating process discussed above. More specifically, the crimping process acts to increase the stress level of the intra-metallic bonds of these components back to near the initial stress level. When the crimping process occurs, however, the diffusion bonds discussed above have been formed and stabilized by heating the components and letting the electrode come back down to ambient or room temperature, respectively. Thus, the crimping process acts to secure or "lock in" the diffusion bonds formed between the emissive element 28, separator 32, and metallic blank 94.

Care must be taken, however, when performing the crimping process, as excessive compression and reduction in the overall diameter or shape of the front end of the electrode proximate the emissive element 28 can damage or destroy the diffusion bonds between the emissive element, separator 32, and metallic blank 94. For example, reducing the diameter of metallic holder by between about 0.050–0.100" from an initial diameter of 0.625" is sufficient to obtain the benefits discussed above, but this reduction may vary depending on what materials are used for the emissive element, separator, and metallic holder.

The following tables present conventional and experimental data showing the effects of heating and crimping the electrode as discussed above. Specifically, the crimping process includes reducing the electrode from a cylindrical shape having a diameter of about 0.625" to a hexagonal shape having an outer diameter of about 0.497". Note that Table I shows electrode operational life span at 260 Amps. The average experimental electrodes in Table I had a life span of approximately 664 minutes, with a standard deviation of 47 minutes, whereas conventional electrodes not receiving the post-assembly heating and crimping processes according to the present invention have an average life span of 475 minutes. Table II shows electrode operational life span at 300 Amps. The average experimental electrodes in Table II had a life span of approximately 300 minutes, with a standard deviation of 50 minutes, whereas conventional electrodes not receiving the post-assembly heating and crimping processes according to the present invention have an average life span of 195 minutes. The plasma arc torch used for obtaining the test results shown in Tables I and II was ESAB Torch PT-15XL using oxygen as the plasma gas.

TABLE I

| ELECTRODE | LIFE SPAN @ 260 AMPS |
| --- | --- |
| CONVENTIONAL | 475 |
| EXPERIMENTAL | 675 |
| EXPERIMENTAL | 677 |
| EXPERIMENTAL | 733 |
| EXPERIMENTAL | 638 |
| EXPERIMENTAL | 663 |
| EXPERIMENTAL | 607 |

TABLE II

| ELECTRODE | LIFE SPAN @ 300 AMPS |
| --- | --- |
| CONVENTIONAL | 195 |
| EXPERIMENTAL | 248 |
| EXPERIMENTAL | 264 |
| EXPERIMENTAL | 330 |
| EXPERIMENTAL | 361 |
| EXPERIMENTAL | 210 |
| EXPERIMENTAL | 272 |
| EXPERIMENTAL | 272 |
| EXPERIMENTAL | 330 |
| EXPERIMENTAL | 379 |
| EXPERIMENTAL | 306 |
| EXPERIMENTAL | 340 |
| EXPERIMENTAL | 276 |

Referring back to FIG. 3, a cross-sectional view of a completed electrode according to the present invention is shown. To complete the fabrication of the holder 16, the rear face 96 of the cylindrical blank 94 is machined to form an open cup-shaped configuration defining the cavity 22 therein. Advantageously, the cavity 22 includes an internal annular recess 82 which defines the cylindrical post 23 and coaxially surrounds portions of the separator 32 and emissive element 28. In addition, the internal annular recess 82 includes an internal surface 83. In other words, the internal annular recess 82 is formed, such as by trepanning or other machining operation, to define the cylindrical post 23.

The external periphery of the cylindrical blank 94 is also shaped as desired, including formation of external threads 102 at the rear end 19 of the holder 16. Finally, the front face 95 of the blank 94 and the end faces 29 and 36 of the emissive element 28 and separator 32, respectively, are machined so that they are substantially flat and flush with one another.

FIG. 10 depicts an end elevational view of the holder 16. It can be seen that the end face 36 of the separator 32 separates the end face 29 of the emissive element 28 from the front face 20 of the holder 16. The end face 36 is annular having an inner perimeter 104 and an outer perimeter 106. The separator 32 serves to discourage the arc from detaching from the emissive element and becoming attached to the holder 16.

Thus, the present invention provides an electrode 14 for use in a plasma arc torch and a method of making an electrode wherein a post-assembly heating process is applied to the electrode to accelerate diffusion bonding between the emissive element 28, separator 32, and metallic holder 16. A crimping process can also be applied to further strengthen and bond these components of the electrode 14. Advantageously, no brazing layers, coatings, or other materials are used between the emissive element 28, separator 32, and metallic holder or blank. In fact, the emissive element and separator, and the separator and metallic holder have surface-to-surface relationships, respectively. Thus, the cost of fabricating an electrode according to the present invention is reduced, while still providing a strong and long-lasting electrode.

That which is claimed:

1. A method of fabricating an electrode adapted for supporting an arc in a plasma torch, the method comprising:
   providing a metallic holder defining a cavity in a front end thereof;
   positioning a relatively non-emissive separator having inner and outer surfaces with the outer surface of the separator being in surfce-to-surface contact with the cavity of the metallic holder;
   positioning an emissive element having an outer surface in the separator with the outer surface of the emissive element being in surface-to-surface contact with the inner surface of the separator; and
   heating the metallic holder, separator, and emissive element after said positioning steps to accelerate diffusion bonding between the emissive element and the separator, and between the separator and the metallic holder.

2. A method according to claim 1, wherein the emissive element positioning step includes pressing the emissive element and separator in the cavity defined by the metallic holder.

3. A method according to claim 1, wherein the emissive element positioning step includes plastically deforming the separator between the emissive element and the metallic holder.

4. A method according to claim 1, wherein the emissive element positioning step includes inserting an emissive element formed substantially from at least one of the materials selected from the group consisting of hafnium, zirconium, tungsten, and alloys thereof.

5. A method according to claim 1, wherein the emissive element positioning step includes inserting the emissive element in a relatively non-emissive separator formed substantially from at least one of the materials from the group consisting of silver, gold, platinum, rhodium, iridium, palladium, nickel, and alloys thereof.

6. A method according to claim 1, wherein the heating step includes heating the assembly and the metallic holder to between about 1400°–1420° F. for at least 5 hours.

7. A method according to claim 6, wherein the heating step includes heating the assembly and the metallic holder to about 1410° F. for about 6.5 hours.

8. A method according to claim 1, further comprising crimping the assembly and the metallic holder by pressing the metallic holder radially inward.

9. A method according to claim 8, wherein the crimping stop includes reducing the diameter of the metallic holder proximate the emissive element by between about 0.050–0.100 inches.

10. A method of forming a electrode adapted for supporting an arc in a plasma torch, the method comprising:

providing an electrode having a emissive element and a relatively non-emissive separator disposed in a cavity defined in a front end of a metallic holder, the emissive element and separator each having intra-metallic bonds that are in an initial stressed state;

relaxing the intra-metallic bonds in the emissive element and the separator from the initial stressed state to a lower stressed state, the relaxing step allowing at least the emissive element and the separator to form diffusion bonds therebetween; and stabilizing the diffusion bonds and the intra-metallic bonds of the emissive element and the separator in the lower stressed state.

11. A method according to claim 10, wherein the providing step includes providing an emissive element formed substantially from at least one of the materials selected from the group consisting of hafnium, zirconium, tungsten, and alloys thereof.

12. A method according to claim 10, wherein the providing step includes providing a relatively non-emissive separator formed substantially from at least one of the materials from the group consisting of silver, gold, platinum, rhodium, iridium, palladium, nickel, and alloys thereof.

13. A method according to claim 10, wherein the relaxing step includes heating the electrode to between about 1400°–1420° F. for at least 5 hours.

14. A method according to claim 13, wherein the relaxing step includes heating the electrode to about 1410° F. for about 6.5 hours.

15. A method according to claim 13, wherein the stabilizing step includes cooling the electrode to ambient temperature.

16. A method according to claim 10, further comprising crimping the front end of the electrode using mechanical pressing tools.

17. A method of forming an electrode for a plasma torch, the method comprising:

providing a metallic holder defining a cavity in a front end thereof;

positioning a relatively non-emissive separator having inner and outer surfaces with the outer surface of the separator being in surface-to-surface contact with the cavity of the metallic holder;

positioning an emissive element having an outer surface in the separator with the outer surface of the emissive element being in surface-to-surface contact with the inner surface of the separator; and heating the metallic holder, separator, and emissive element after said positioning steps to about 1400°–1420° F. for at least 5 hours.

18. A method according to claim 17, further comprising crimping the front end of the metallic holder after the heating step.

19. An electrode for a plasma arc torch, comprising:

a metallic holder defining a cavity in a front end thereof;

a relatively non-emissive separator having inner and outer surfaces with the outer surface of the separator being in surface-to-surface contact with the cavity of the metallic holder;

an emissive element having an outer surface, at least a portion of the outer surface of the emissive element being in surface-to-surface contact with the inner surface of the separator; and diffusion bonds between the emissive element and the separator, and between the separator and the metallic holder, the diffusion bond between the emissive element and the separator being about 0.0004", and the diffusion bond between the separator and the metallic holder being about 0.005".

20. An electrode according to claim 19, wherein the diffusion bonds are formed by heating the metallic holder, emissive element, and separator to between about 1400°–1420° F.

* * * * *

UNITED STATES PATENT AND TRADEMARK OFFICE
CERTIFICATE OF CORRECTION

PATENT NO. : 6,657,153 B2  Page 1 of 1
DATED : December 2, 2003
INVENTOR(S) : McBennett et al.

It is certified that error appears in the above-identified patent and that said Letters Patent is hereby corrected as shown below:

<u>Column 10,</u>
Line 47, "surfce" should read -- surface --.

<u>Column 11,</u>
Line 20, "stop" should read -- step --.

Signed and Sealed this

Twenty-fourth Day of February, 2004

JON W. DUDAS
*Acting Director of the United States Patent and Trademark Office*